United States Patent [19]

Hashiguchi et al.

[11] Patent Number: 4,706,090
[45] Date of Patent: Nov. 10, 1987

[54] SHIP COLLISION PREVENTIVE AID APPARATUS

[75] Inventors: Shinji Hashiguchi, Suita; Hisayuki Kimata, Nara; Yukuo Koga, Tokyo, all of Japan

[73] Assignees: Hitachi Zosen Corp; Kabushiki Kaisha Koden Seisakusho, both of Japan

[21] Appl. No.: 693,099

[22] Filed: Jan. 22, 1985

[30] Foreign Application Priority Data

Jan. 27, 1984 [JP] Japan .................... 59-14046

[51] Int. Cl.⁴ .................... G01S 7/22; G06F 15/50
[52] U.S. Cl. .................... 342/41; 342/182; 342/455; 364/461; 340/712
[58] Field of Search ............ 343/5 EM, 455; 364/443, 364/461; 340/712; 342/41, 176, 177, 182, 183, 455

[56] References Cited

U.S. PATENT DOCUMENTS

| | | | |
|---|---|---|---|
| 4,205,313 | 5/1980 | Pease | 343/5 EM X |
| 4,286,289 | 8/1981 | Ottesen et al. | 340/712 X |
| 4,542,375 | 9/1985 | Alles et al. | 340/712 X |

Primary Examiner—T. H. Tubbesing
Assistant Examiner—Gilberto Barrón, Jr.
Attorney, Agent, or Firm—Darby & Darby

[57] ABSTRACT

The present application discloses a ship collision preventive aid apparatus in which a radar picture and a key picture are selected from all pictures displayed on a display means as transmitted through a touch panel, and the operator touches the surface of the touch panel, so that a program for an operation key name selected is executed. Predetermined collision preventive aid data required for collision avoidance are then displayed on a display screen.

With operation simplified, appropriate information concerning collision avoidance may be supplied and the entire construction is simplified.

2 Claims, 16 Drawing Figures

SHIP COLLISION PREVENTIVE AID APPARATUS

FIELD OF THE ART

The present invention relates to a ship collision preventive aid apparatus for supplying the operator appropriate information concerning collision avoidance.

BACKGROUND OF THE INVENTION

There is conventionally known a ship collision preventive aid apparatus of the type above-mentioned having a cathode-ray tube ( hereinafter referred to as CRT ) for displaying a radar picture, a display means including a detector means for processing the radar picture to detect movements of other ships, and an operation means including a plurality of per-function operation switches, a track ball or a joy stick for adjusting the cross mark setting position, a variable range marker, an electronic cursor adjusting dial, and an indicator for displaying the positions, courses and speeds of own ship and other ships.

Based on the operation and setting of the operation means, the radar picture displayed on the CRT from one minute to the next is processed in the detector means to detect the movements of other ships.

On the CRT screen, there are displayed collision preventive aid data of a cross mark, a suppression zone or other to be discussed later, and also collision preventive aid data of the courses, speeds or the like of other ships. On the radar screen, alarm marks are also displayed as overlapping on or adjacent to the images of other ships which are in a great danger of collision with the own ship on the radar screen.

For example, when a target ship is to be manually acquired to display a cross mark, a target manual acquisition operation switch of the operation means is turned ON to display, on the radar screen, a cross mark for designating a target to be acquired. By operating the joy stick or track ball, the cross mark is moved onto the image of the target ship which is in a great danger of collision with the own ship. With such operation, the target ship to be acquired is displayed together with display of the data of the target ship such as the position, course, speed on the indicator of the operation means.

For setting and displaying a guard zone, a guard ring setting operation switch of the operation means is turned ON, and the variable range marker is then adjusted to set a guard ring having a desired radius. With the desired guard ring set and displayed on the radar screen, an alarm is adapted to be given when other ships enter the guard zone. The operator is thus informed of access of other ships.

For setting and displaying a suppression zone, a suppression zone setting operation switch of the operation means is turned ON, and the electronic cursor adjusting dial is then operated. On the radar screen, there are set and displayed two suppression lines by electronic cursors having a desired crossing angle and located symmetrically with respect to the stem direction, so that a suppression zone is set and displayed outside of the suppression lines. At this time, only the data such as courses and speeds of other ships outside of the suppression zone are detected by the detector means, and only other ships outside of the suppression zone are subjected to acquisition and tracking.

For setting and displaying a safety fairway for the own ship, a fairway setting operation switch of the operation means is turned ON and the electronic cursor adjusting dial is then operated. On the radar screen, there are displayed two fairway lines by electronic cursors to set and display a fairway bordered by these two fairway lines.

According to such arrangements, the CRT, the display means and the operation means are independently disposed, thereby to render manipulation very complicated to disadvantageously reduce the working efficiency.

Moreover, when setting and displaying collision preventive aid data such as a cross mark with a joy stick or a track ball, accurate fine adjustment cannot be made, thereby to reduce setting accuracy to provoke erroneous manipulation. Thus, there is a great danger of serious accidents occurring.

Furthermore, such separate arrangement of the CRT, the display means and the operation means causes the apparatus to be constructed in a complicated manner and in a large size.

DISCLOSURE OF THE INVENTION

The present invention provides a ship collision preventive aid apparatus comprising: a display means including a cathode-ray tube for displaying a radar picture, key pictures and collision preventive figures and data such as own ship data and other ship data, said figures and data displayed overlappingly on the radar picture; a touch panel for supplying position signals of operation points on the panel to be contact-operated by the operator, said touch panel overlappingly disposed on the display screen of the display means and transmitting all pictures displayed on the display screen; a forming means for forming, based on position signals from the touch panel, the coordinates of selection points on the display screen corresponding to said contact points on the panel; a judging means for judging, by output signals from the forming means, which pictures are currently displayed as selected from the radar picture and the pictures for the operation key names; and a processing means for executing programs for the operation key names identified based on output signals from the judging means, thereby to display collision preventive aid data.

DETAILED DESCRIPTION OF THE PREFERRED EMBODIMENTS

The description hereinafter will discuss the invention in detail with reference to the attached drawings.

Figure 1:
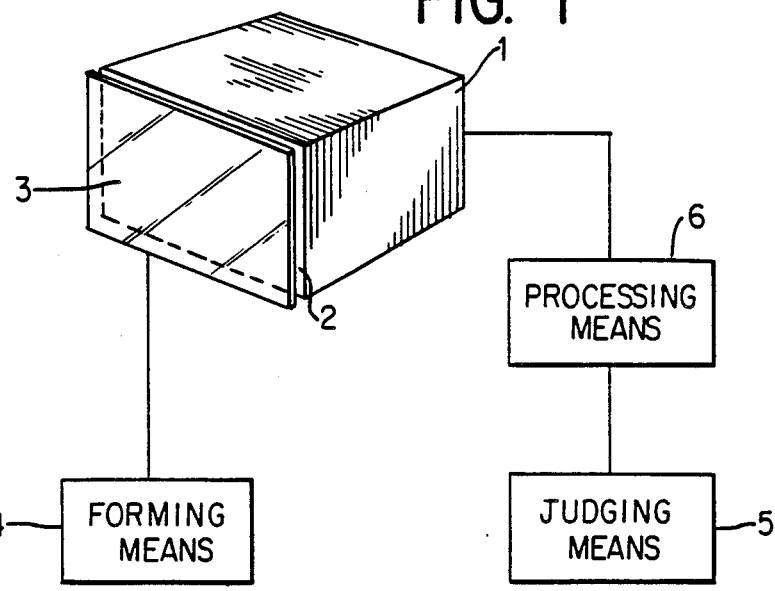
FIG. 1 is a block diagram of ship collision preventive aid apparatus in accordance with the present invention.
Figure 2:
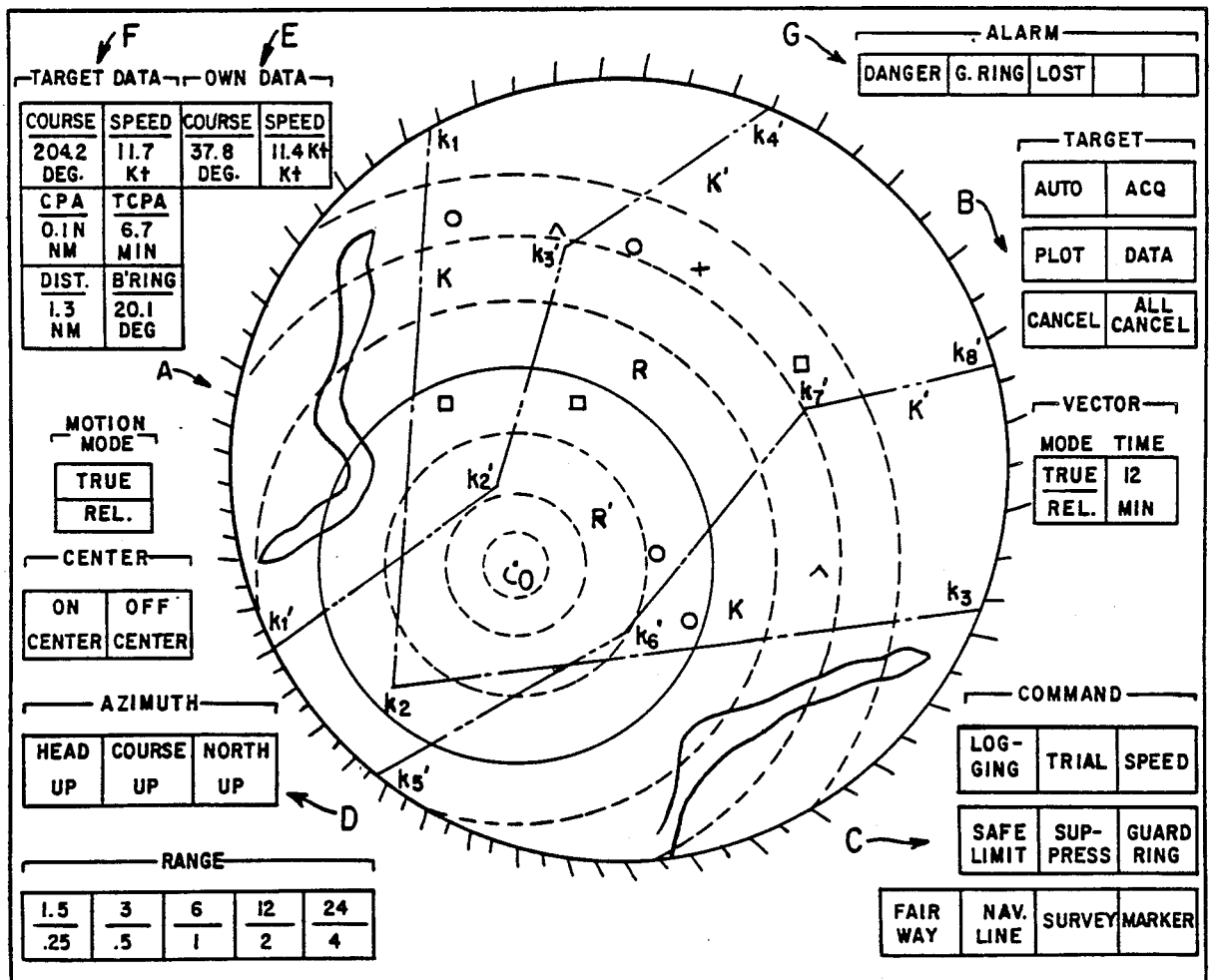
FIG. 2 is a front view of a display screen.

In FIG. 1, a display means 1 has a color cathode-ray tube ( hereinafter referred to as CRT). As shown in FIG. 2, the display screen 2 of the CRT displays at the center thereof a radar picture A, and is alloted at the upper right portion and the lower left portion thereof to display areas of stationary commands. The display screen 2 is also alloted at the lower right portion to a display area of non-stationary commands, and at the upper left portion to a display area of numerical data.

A first key picture B is stationarily displayed on the stationary command display area of the display screen 2 at the upper right portion thereof. At this first key picture B, there are displayed the names of other key pictures for target acquisition operation commands; that is, "AUTO" for automatic acquisition, "ACQ" for acquisition of a specified target, "PLOT" for display of a track, "DATA" for display of numerical data, "CANCEL" for cancellation of a specified target, and "ALL CANCEL" for cancellation of all targets.

Also stationarily displayed under the first key picture B of the display screen 2 are operation key names "TRUE" and "REAL" for changeover of the vector display mode of true or relative speed, and "TIME" for vector amount, for example 12 min.

A second key picture C is non-stationarily displayed on the display screen 2 at the lower right portion thereof. At this second key picture C, there are displayed ten perfunction operation key names for calling setting commands of a guard zone, a suppression zone, a fairway or the like, with the use of a command return operation to be discussed later; that is, "LOGGING" for printing out logging data, "TRIAL" for trial maneuvering,"SPEED" for setting the speed of own ship, "SAFE LIMIT" for setting a safe limit, "SUPPRESS" for setting a suppression zone, "GUARD RING" for setting a guard ring, "FAIRWAY" for displaying a fairway, "NAV.LINE" for setting a navigation line, "SURVEY" for measurements, and "MARKER" for setting a marker.

A third key picture D is stationarily displayed on the display screen 2 at the lower left portion thereof. At the third key picture D, there are displayed ten names of individual key pictures respectively: "ON CENTER" and "OFF CENTER" for changeover of the bearing scale center; "HEAD UP ", "COURSE UP" and "NORTH UP" for selecting the bearing mode; "1.5/0.25", "3/0.5". "6/1 ", "12/2 " and "24/4" for selection of the display range.

Also displayed above the third key picture D are "TRUE" and"RELA" for changeover of the motion display mode of true or relative motion.

Own ship data E and other ship data F are stationarily displayed on the display screen 2 at the upper left portion thereof for the numerical data display area, the data E and F being numerical data of the position, course, speed and other of own ship and target ship.

An alarm mark picture G for indicating danger, error, or entry of other ships into the guard zone is displayed above the first key picture B.

An touch panel 3 is overlappingly disposed on the screen 2 and may transmit all pictures displayed on the display screen 2. The panel 3 is adapted to supply voltage signals or position signals representing the positions of contact points on the panel 3 to be contact-operated.

FIG. 1 also shows a forming means 4 to which position signals are entered from the touch panel 3. By position signals entered from the forming means 4, the coordinates of the selection points on the display screen 2 corresponding to contact points on the panel 3, are picked up and signals representing the coordinates are supplied.

The touch panel 3 can be provided by any one of a number of known touch panels including resistance film types, capacitance types, optical types, and so forth. For example, such a resistive film type panel is touch panel E270, manufactured by Elographics Inc., USA. A typical optical type panel is shown in Alles et al U.S. Pat. No. 4,542,375.

There is also disposed a judging means 5 to which signals from the forming means 4 are entered. By signals entered from the forming means 4, the judging means 5 judges which pictures are currently displayed as selected from the pictures A,B,C and D, and then supplies judgment signals.

A processing means 6 comprises a microcomputer in which various processing and display sequences are previously programmed, and performs processing and display of collision preventive aid data, based on judgment signals from the judging means 5. That is, where the first key picture B or the second key picture C and the radar screeeen A are continuously selected, the program corresponding to a selected operation key name of the key picture B or C selected, is executed. Predetermined collision prevention aid data are then overlappingly displayed on the radar picture A on the display screen of the display means 1. Data of own ship and acquired ship are calculated from the radar picture A, and the data thus calculated are displayed on the display screen 2 at TARGET DATA F and OWN DATA E thereof. When the third key picture D is selected, the program corresponding to a selected operation key name of the third key picture D is executed to switch the display mode for display range or the like of the radar picture A.

When other picture than the key pictures B to D and the radar picture A is selected, the display screen 2 displays the alarm mark G informing the operator of the occurrence of error. Marks and □ indicating hazardous targets are overlappingly displayed on the radar picture A at the images of other ships. The marks and □ are displayed in different colors dependent on the grade of harzard of collision.

The description hereinafter will discuss the operation of the apparatus in accordance with the embodiment of the present invention discussed hereinbefore.

The description will be first made of the operation for overlappingly displaying a cross mark of collision preventive aid data on the image of a target ship acquired on the radar picture A.

For such application, the operation keys of the first key picture B and the radar picture A are to be used.

For automatic acquisition of the target ship, there are selected the first key picture B and the radar picture A from all pictures displayed on the display screen 2 as transmitted through the panel 3. The operator touches the surface of the panel 3 at its first contact point on which displayed is the operation key name "AUTO" for an automatic acquisition command of the first key picture B, thereby to turn ON the automatic acquisition processing function of the processing means 6. The operator then touches the surface of the panel 3 at its second operation point on which displayed is the image of a target ship on the radar picture A. The panel 3 supplies position signals representing the positions of both first and second operation points, to the forming means 4. The forming means 4 picks up the coordinates on the display screen 2 corresponding to both operation points on the panel 3, that is, the coordinates of the operation points on the X-Y coordinates set on the display screen 2, and supplies signals representing the coordinates of the contact points on the panel 3, to the judging means 5.

By the signals thus entered from the forming means 4, the judging means 5 judges that the selected pictures are the first key picture B and the radar picture A. According to the judgement signals supplied from the judging means 5, the processing means 6 executes the automatic acquisition program to supply a processing signal to the display means 1. A cross mark which is one of collision preventive aid data, is overlappingly displayed on the image of the target ship on the radar picture A specified by the second operation point. The target ship on which the cross mark is put, is thus acquired. Target ship data F of the position, course, speed or the like of the target ship are displayed together with own ship data E of the position or the like of own ship. Acquisition of target ship is thus automatically made.

Where the own ship is in a great danger of collision with the acquired ship, the alarm mark G is displayed to inform the operator of the danger of collision.

The description will then be made of the operation for displaying collision preventive aid data auxiliarily added such as a guard ring, a suppression zone or the like, with the use of the operation keys of the second key picture C and the radar picture A.

Here, it is to be noted that, based on control of the processing means 6, the second key picture C may be changed in display to non-stationary display for commands alternatively selected from the ten command calling operation key names: "LOGGING". . . "MARKER".

Figure 3A:
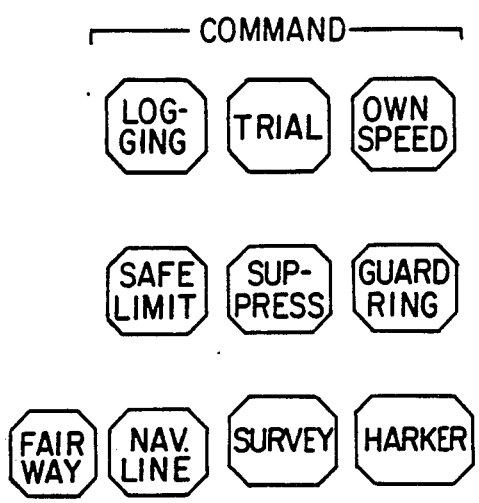
FIG. 3 (a) & (b) and FIG. 4 (a) & (b) are views, illustrating change in display of a non-stationary display area in FIG. 2.
Figure 3B:
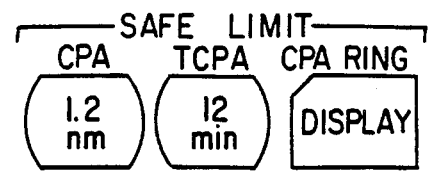

For example, when the operation key name "SAFE LIMIT" for calling a safe limit setting command is selected, the display of the command calling operation key names shown in FIG. 3 (a) is changed to that of the safe limit command, to be discussed later, shown in FIG. 3 (b).

Figure 4A:
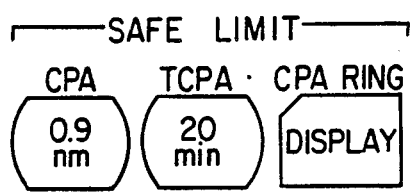
Figure 4B:
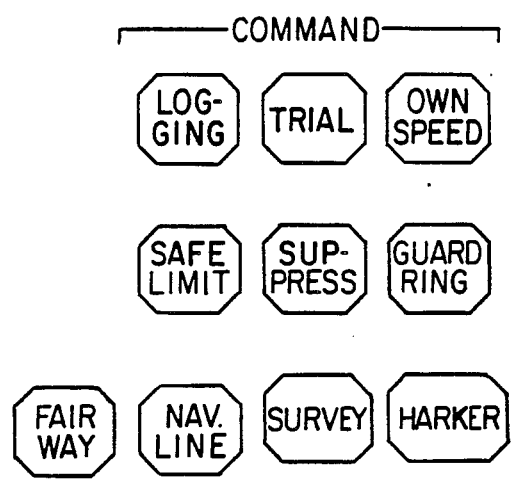

When the display of a selected command is made, a command return operation key name "RETURN" is displayed on the display screen 2 at the lower right portion thereof. When this operation key name "RETURN" is selected by a command return operation, the display of the safe limit commands shown in FIG. 4 (a) is changed to that of the command calling operation key names shown in FIG. 4 (b).

Figure 5:
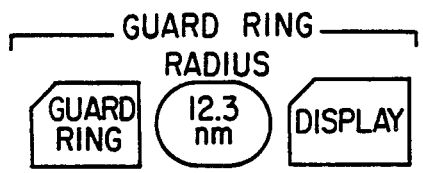
FIGS. 5 to 14 are views, illustrating the displays of the non-stationary display area.

For displaying a guard ring with a guard zone set, the radar picture A and the second key picture C are selected from all pictures displayed on the display screen 2 as transmitted through the panel 3, as done for automatic acquisition discussed hereinbefore. The operator then touches the surface of the panel 3 at its contact point on which displayed is the operation key name for calling a guard ring setting command "GUARD RING" of the second key picture C the display of which has been reset by the command return operation. The display of the second key picture C is then changed to the display of guard ring commands as shown in FIG. 5, including a guard ring function ON/OFF command key name "GUARD RING", a guard ring radius setting key name "RADIUS", and a guard ring display and erasion command key name "DISPLAY". Simultaneously, the guard ring processing function of the processing means 6 is turned ON.

The operator touches the surface of the panel 3 at its operation point on which "RADIUS" is displayed, and then touches the surface of the panel 3 at its contact point representing a predetermined guard ring radius on the radar picture A, thereby to set the radius of a guard ring. Displayed under "RADIUS" is a numeral, for example 12.3 nm, of the set guard ring radius.

When the operator then touches the surface of the panel 3 at its operation point corresponding to the command key name "GUARD RING", the processing means 6 starts executing a guard zone program. As shown in FIG. 2, there is overlappingly displayed on the radar picture A a guard ring R having a radius extending from the own ship position or origin 0 to the selected point on the radar picture A corresponding to the contact point on the panel 3. There are also set a guard zone concentric with this guard ring R.

Where other ships enter the guard zone thus set, it is judged there is a great danger of collision. The alarm mark G for indicating entry of other ships into the guard zone is displayed on the display screen 2 at the upper right portion thereof, to inform the operator of the danger of collision.

Figure 6:
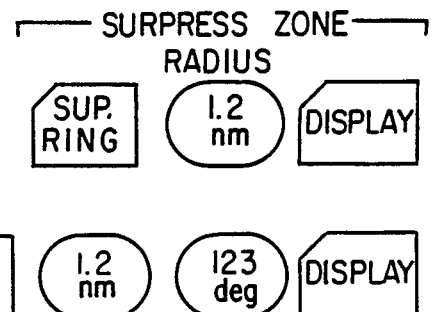

For setting and displaying a suppression zone, the second key picture C and the radar picture A are selected. The operator touches the surface of the panel 3 at its operation point corresponding to the operation key name for calling a suppression zone setting command "SUPPRESS" of the second key picture C the display of which has been reset by the command return operation. The display of the second key picture C is then changed to that shown in FIG. 6. That is, there are displayed, at the upper portion, a command key name for suppression ring function ON,/OFF "SUP.RING", a suppression ring radius setting key name"RADIUS", and a suppression ring display and erasion command key "DISPLAY", and, at the lower portion, the key name of a command for setting the distance between the suppression lines "SUP.LINE", suppression line distance and crossing angle setting key names "DISTANCE" and "ANGLE" and the key name of a command for display and erasion of the suppression lines "DISPLAY". Suppression ring processing and suppression line processing functions of the processing means 6 are also turned ON.

In accordance with this embodiment, the suppression zone is located inside of the suppression ring having a set radius with the own ship being the center, and outside of two suppression lines.

The operator first touches the surface of the panel 3 at its contact point corresponding to the key name "RADIUS", and then touches the surface of the panel 3 at its operation point representing a desired suppression ring radius, thereby to set the radius of a suppression ring. The operator then touches the surface of the panel 3 at its contact points corresponding to the key names "DISTANCE" and "ANGLE". The operator then touches the surface of the panel 3 at its three contact points representing a desired common suppression starting point k2 and desired suppression ending points k1 and k3 on the radar picture A, thereby to set two suppression lines. A numeral, for example 1.2 nm, representing the radius of the suppression ring thus set is then displayed under the key name "RADIUS" on the upper portion of the suppression zone display. Numerals, for example 1.2 nm and 123 deg., representing the distance and crossing angle of the suppression lines thus set, are displayed under the key names "DISTANCE" and "ANGLE" on the lower portion of the suppression zone display.

The operator then touches the surface of the panel 3 at its contact points corresponding to the command key names "SUP.RING" and "SUP.LINE". The processing means 6 then executes a program for suppression zone. As shown in FIG. 2, there are overlappingly displayed on the radar picture A a suppression ring R' with the own ship or origin 0 being the center, and two electric cursors or suppression straight lines K connecting the point k2 to the points k1 and k3, respectively. There is thus set a suppression zone inside of the suppression ring R' and outside of the suppression lines K.

Figure 7:
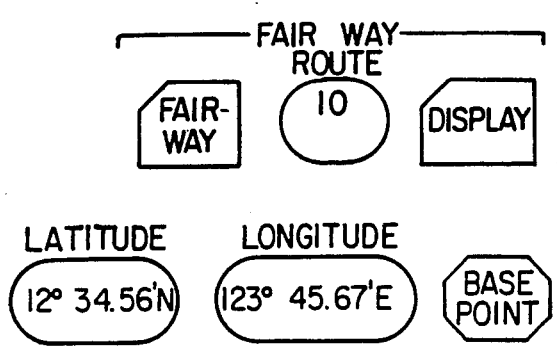

For setting and displaying a fairway, the second key picture C and the radar picture A are selected. The operator touches the surface of the panel 3 at its contact point corresponding to the operation key name for calling a fairway setting command"FAIRWAY" of the second key picture C the display of which has been reset by the command return operation. The display of the second key picture C is then changed to the display of fairway commands as shown in FIG. 7. That is, there are displayed, at the upper portion, a fairway function ON/OFF command key name "FAIRWAY", a route setting key name "ROUTE" and a fairway display and erasion command key name "DISPLAY", and at the lower portion, base point latitude and longtitude setting key names "LATITUDE" and "LONGTITUDE", and a base point position specifying command key name "BASE POINT". A fairway processing function of the processing means 6 is turned ON.

The operator touches the surface of the panel 3 at its contact point corresponding to the key name "BASE POINT" to display the base point on the radar picture A. The operator also touches the surface of the panel 3 at its contact points corresponding to the key names "LATITUDE" and "LONGTITUDE". The operator then touches the surface of the panel 3 at its contact points representing fairway setting points on the radar picture A, thereby to execute a fairway setting program. As shown by two-point chain lines in FIG. 2, there is displayed a safety fairway for the own ship bordered by two electronic cursors K' forming turned lines which successively connect the selected points k1' to k4' to one another, and k5' to k8' to one another on the radar picture A.

It is to be noted that numerical data to be displayed may be entered through the key board.

For logging data printing-out, trial maneuvring, own ship speed setting, safe limit setting, navigation line setting, survey, and marker setting, the operator touches the surface of the panel 3 at its contact points respectively corresponding to the command calling key names "LOGGING", "TRIAL", "SPEED", "SAFE LIMIT", "NAV. LINE", "SURVEY", and "MARKER" of the second key picture C. The display of the second key picture C is changed to the display of commands thus called. Contact-operation may be then made for each of the displayed commands, in the same manner as made for guard zone setting, suppression zone setting and fairway setting discussed hereinbefore.

Figure 8:
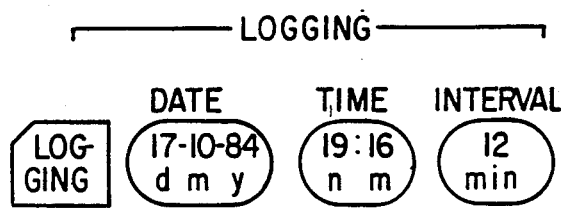

Upon the calling of commands, the displays of non-stationary commands are changed to those shown in FIGS. 8 to 14, respectively. That is, FIG. 8 shows the display for printing out logging data. There are displayed a logging function ON/OFF command key name "LOGGING", a date setting key name "DATE", a time setting key name "TIME" and a printing interval setting key name "INTERVAL". Numerical data set are displayed under "DATE", "TIME" and "INTERVAL", respectively.

Figure 9:
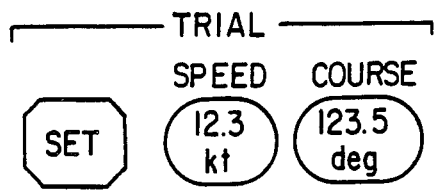

FIG. 9 shows the display for trial maneuvring. There are displayed a trial maneuvring setting key name "SET", a trial speed setting key name "SPEED", and a trial course setting key name "COURSE". Numerical data set are displayed under "SPEED" and "COURSE", respectively.

Figure 10:
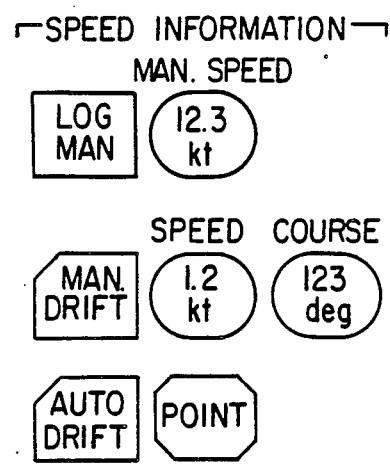

FIG. 10 shows the display for own ship speed setting. There are displayed, at the upper portion, a log/manual speed changeover key name "LOG MAN", and a manual speed-setting key name "MAN. SPEED", and at the intermediate portion, a manual drift ON/OFF command key name "MAN. DRIFT", a drift speed setting key name "SPEED", and a drift course setting key name "COURSE", and at the lower portion, an autodrift ON/OFF command key name "AUTO DRIFT" and an autodrift reference target acquisition command key name "POINT". Numerical data set are displayed under "SPEED" at the upper portion and under "SPEED " and "COURSE" at the intermediate portion.

Figure 11:
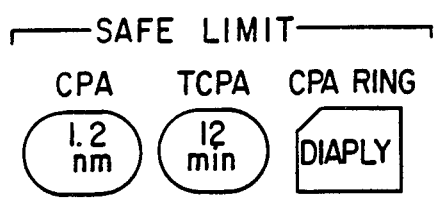

FIG. 11 shows the display for safe limit setting. There are displayed a closest-point-of-approach setting key name "CPA", a key name for setting time required for approaching the closest point "TCPA" and a CPA ring display and erasion command key name "CPA RING". Numerical data set are also displayed under "CPA" and "TCPA", respectively.

Figure 12:
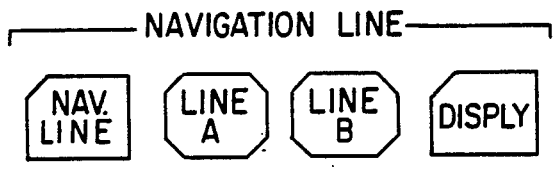

FIG. 12 shows the display of commands for navigation setting. There are displayed a navigation line function ON/OFF command key name "NAV.LINE", a course starting point A setting key name "LINE A ", a course ending point B setting key name "LINE B" and a navigation line display and erasion command key name "DISPLAY".

Figure 13:
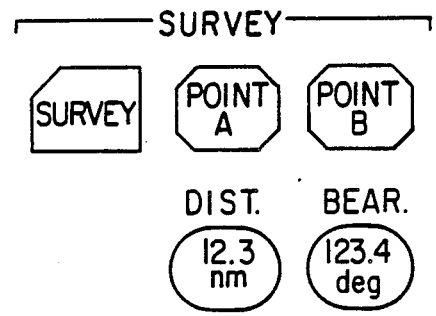

FIG. 13 shows the display of commands for measuring the bearing and distance between two points specified. There are displayed, at the upper portion, a survey function ON/OFF command key name "SURVEY", a starting point A setting key name "POINT A " and an ending point B setting key name "POINT B ", and at the lower portion, distance and bearing display areas "DIST" and "BEAR". Numerical data of measured distance and bearing are displayed under "DIST" and "BEAR".

Figure 14:
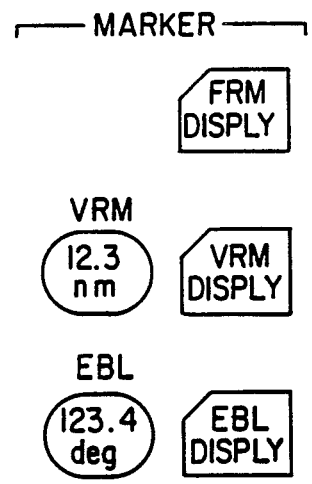

FIG. 14 shows the display of commands for marker setting. There are displayed, at the upper portion, a fixed distance scale display and erasion command key name "FRM DISPLAY", and at the intermediate portion, a variable distance scale setting key name "VRM" and a variable distance scale display and erasion command key name "VRM DISPLAY", and at the lower portion, an electronic cursor setting key name "EBL" and an electronic cursor display and erasion command key name "EBL DISPLAY". Numerical data set are displayed under "VRM" at the intermediate portion and "EBL" at the lower portion.

If the operator touches the surface of the panel 3 transmitting other picture than the key pictures B to D and the radar picture A, the alarm mark G indicating the occurrence of error is displayed on the display screen 2 at the upper right portion thereof.

According to the embodiment discussed hereinbefore, a program for an operating key name of the key picture B or C selected is automatically executed by merely selecting the radar picture A and the first or second key picture B or C from all pictures displayed on the display screen 2 as transmitted through the panel 3 and touching the surface of the panel 3. Collision preventive aid data and figures such as a cross mark, a guard ring, a suppression zone, a fairway or the like may be readily and accurately displayed as overlappingly on the radar picture, thus supplying the operator appropriate information concerning collision avoidance with simplified operation.

Arrangement of overlap display of collision preventive aid data of the key pictures B to D on the display screen 2 allows conventional CRT, display means and operation means to be constructed in a unitary and simple structure.

Provision of a non-stationary display area for the second key picture C on the display screen 2, permits one display area to be utilized for display of a plurality of per-function operation keys. The operating efficiency may be thus improved.

In summation, according to the ship collision preventive aid apparatus in accordance with the present invention, the touch panel is contacted by selecting the radar picture and a key picture from pictures displayed on the cathode-ray tube as transmitted through the touch panel, and the program corresponding to the key picture thus selected is then executed to carry out predetermined operations. Therefore, when catching targets or setting the guard zone for example, it is not required to operate a joy stick or a tracking ball as conventionally done. Merely by contacting with the desired picture through the touch panel, targets can be caught and the guard zone center, etc. can be set, thus considerably facilitating the operation of the apparatus.

Further, according to the present invention, the key pictures, data and marks are displayed around the radar picture on the display screen of the cathode-ray tube. Such arrangement eliminates operation means including a plurality of mechanical switches, and independent display units for data and marks which are conventionally required. Thus, the apparatus of the present invention can be formed generally in a small size.

In addition, the alteration in design of the pictures to be displayed has been conventionally very difficult to accomplish, due to the presence of mechanical elements incorporated in the operation means. On the other hand, the operation means in the present invention does not include mechanical elements, so that the pictures to be displayed can be easily altered in design merely by altering the program of the processing means.

What we claim is:

1. A ship collision preventive aid apparatus comprising:
    (1) a color cathode ray tube including a display screen for displaying the following pictures:
        (i) a radar picture displayed on said display screen at the center thereof on which figures including arrows, circles, straight lines, and squares are overlapping displayed;
        (ii)
            (a) a first key picture for a command for automatic catching of either one or a combination of targets, including a designated target, wake display, or cancellation of a designated target,
            (b) a second key picture for calling a command for setting either a guard zone, a suppress zone, or a fairway,
            (c) a third key picture for either switching an ON-center/OFF-center of a bearing scale, selecting a bearing mode, or switching a display range,
        said pictures (a), (b) and (c) being displayed on said display screen at a portion of the periphery thereof,
        (iii) own ship data and other ship data displayed on said display screen at a different part of the periphery thereof,
        (iv) alarm marks for informing the operator of the entrance of other ships either in or entering into the guard zone or error, said alarm marks being displayed on said display screen at a still different part of the periphery thereof,
    (2) a touch panel for supplying position signals representing contact points on said panels contacted by the operator, said touch panel overlapping disposed on the display screen of said cathode-ray tube and transmitting pictures displayed on said display screen;
    (3) a forming means for forming, based on said position signals, the coordinates of selected points on said display screen corresponding to said contact points on said panel;
    (4) a judging means for judging, by output signals form said forming means, that the picture including the coordinates of said selected points is any of said key pictures, said radar picture or other picture than said key pictures and said radar picture,
    (5) a processing means for executing predetermined programs, based on output signals from said judging means, thereby to perform the operations as follows:
        (i) when said first or second key picture and the radar picture are continuously selected,
            (a) a program corresponding to said first or second key picture selected is executed to overlappingly display, on said radar picture, predetermined ship collision preventive aid data such as cross marks representing designated targets which have been caught, the course and the wake of other ships designated, the guard zone, the suppress zone, or the fairway,
            (b) data of the own ship and other ships caught as targets are computed based on said radar picture and displayed on said display screen at the periphery thereof, and there are overlappingly displayed, on that portion of said radar picture showing other ships, figures such as small circles, or small squares, in respectively different colors dependent on the degree of danger of collison determined based on the data thus computed,
            (c) when setting the guard zone, the suppress zone, the fairway or the like, said second key picture being temporarily changed to a setting command key picture for the guard ring, the suppress zone, or the fairway,
        (ii) when said third key picture is selected, the program corresponding to said third key picture is executed for carrying out the operations including the display of the ON-center/OFF-center of said radar picture, the display of the head-up, the display of the north-up, the switching of the display range, and
        (iii) when a picture other than any of said key pictures and said radar picture is selected, there is displayed an alarm mark informing the operator of the occurrence of an error, on said display screen at the periphery thereof.

2. A method for a ship collission prevention aid apparatus including a color cathode-ray tube having a display screen, and a substantially transparent touch panel overlying said display screen for providing position signals corresponding to contact points on said panel contacted by an operator, the method comprising the steps of:

(1) displaying on the display screen the following pictures;
  (i) a radar picture displayed on said display screen at the center thereof on which figures including either one or a combination of arrows, circles, straight lines, relatively small circles, and relatively small squares are overlappingly displayed,
  (ii)
    (a) a first key picture for a command for automatic catching of targets, catching of a designated target, wake display, cancellation of a target designated, or the like,
    (b) a second key picture for calling a command for setting a guard zone, a suppress zone, or a fairway,
    (c) a third key picture for either switching an ON-center/OFF-center of a bearing scale, selecting a bearing mode or switching the display range,
  said pictures of (ii) (a), (b) and (c) being displayed on said display screen at the periphery thereof,
  (iii) own ship data and other ship data displayed on said display screen at a different part of the periphery thereof than the pictures of (ii) (a), (b) and (c),
  (iv) alarm marks for informing an operator either of the entrance of other ships into a guard zone or an error, said alarm marks being displayed on said display screen at a still different part of the periphery thereof relative to other data,
(2) forming from said position signals, the coordinates of selected points on said display screen corresponding to said contact points on said panel;
(3) judging from said coordinates, output signals that the picture including the coordinates of said selected points is any of said key pictures, said radar picture or other picture than said key pictures and said radar picture,
(4) executing predetermined programs based upon the results of said judging step, thereby to perform the following operations:
  (i) when said first or second key picture and the radar picture are continuously selected,
    (a) a program corresponding to said first or second key picture selected being executed to overlapping display, on said radar picture, predetermined ship collision preventive aid data including cross marks representing designated targets which have been caught, the course and the wake of other ships designated, the guard zone, the suppress zone, or the fairway,
    (b) data of own ship and other ships caught as targets being computed based on said radar picture and displayed on said display screen at the periphery thereof, and overlappingly displaying on that portion of said radar picture showing other ships, figures such as circles, and squares, in respectively different colors dependent on the degree of danger of collision determined based on the data thus computed,
    (c) when setting the guard zone, the suppress zone, the fairway or the like, said second key picture being temporarily changed to a setting command key picture for the guard ring, the suppress zone, or the fairway,
  (ii) when said third key picture is selected, the program corresponding to said third key picture being executed for carrying out the operations including the display of the ON-center/OFF-center of said radar picture, the display of the head-up, the display of the north-up, the switching of the display range,
  (iii) when a picture other than any of said key pictures and said radar picture is selected, displaying an alarm mark on the periphery of said display screen for informing the operator of the occurrence of an error.

* * * * *